United States Patent
Paquette

(10) Patent No.: US 12,396,824 B2
(45) Date of Patent: Aug. 26, 2025

(54) ORTHODONTIC ARCHWIRE

(71) Applicant: Ortho Organizers, Inc., Carlsbad, CA (US)

(72) Inventor: David Paquette, Mooresville, NC (US)

(73) Assignee: Ortho Organizers, Inc., Carlsbad, CA (US)

( * ) Notice: Subject to any disclaimer, the term of this patent is extended or adjusted under 35 U.S.C. 154(b) by 314 days.

(21) Appl. No.: 17/071,903

(22) Filed: Oct. 15, 2020

(65) Prior Publication Data

US 2022/0117700 A1 Apr. 21, 2022

(51) Int. Cl.
*A61C 7/20* (2006.01)

(52) U.S. Cl.
CPC ...................... *A61C 7/20* (2013.01)

(58) Field of Classification Search
CPC ....... A61C 7/20; A61C 2201/007; A61C 7/22; A61C 7/28; A61C 7/12; A61C 7/08; C22C 9/00; C22C 19/00; C22C 14/00; C22C 38/00
See application file for complete search history.

(56) References Cited

U.S. PATENT DOCUMENTS

| | | | | |
|---|---|---|---|---|
| 2,566,414 A * | 9/1951 | Henry | ....................... | A61C 7/20 72/414 |
| 3,261,181 A * | 7/1966 | Scott | ......................... | A44C 9/00 63/15 |
| 4,097,993 A * | 7/1978 | Andrews | .................. | A61C 7/20 433/20 |
| 4,818,226 A * | 4/1989 | Berendt | .................... | A61C 7/20 433/20 |
| 4,892,479 A * | 1/1990 | McKenna | ................. | A61C 7/20 433/20 |
| 5,092,941 A * | 3/1992 | Miura | ....................... | A61C 7/00 148/563 |
| 5,174,753 A * | 12/1992 | Wool | ........................ | A61C 7/20 433/20 |
| 5,176,514 A | 1/1993 | Viazis | | |
| 5,259,760 A * | 11/1993 | Orikasa | .................... | A61C 7/20 433/20 |
| 5,456,600 A * | 10/1995 | Andreiko | ................. | A61C 7/20 433/20 |
| 5,474,448 A * | 12/1995 | Andreiko | ................. | A61C 7/00 433/8 |

(Continued)

FOREIGN PATENT DOCUMENTS

JP 2016-198503 A 12/2016

OTHER PUBLICATIONS

MedicalNewsToday. What is Diastema? Medically reviewed by Jennifer Archibald, DDS—By Jayne Leonard on Mar. 4, 2020 (Year: 2020).*

(Continued)

*Primary Examiner* — Heidi M Eide
*Assistant Examiner* — Lina Faraj
(74) *Attorney, Agent, or Firm* — Fulwider Patton LLP

(57) ABSTRACT

An orthodontic archwire is configured to treat a number of malocclusions. The archwire has a straight anterior section between a first posterior section and a second posterior section. The first posterior section and the second posterior section each have multiple radii of curvature and are mirror images of each other.

19 Claims, 2 Drawing Sheets

(56) References Cited

U.S. PATENT DOCUMENTS

| | | | |
|---|---|---|---|
| 5,624,258 A * | 4/1997 | Wool | A61C 7/20 433/20 |
| 5,683,245 A * | 11/1997 | Sachdeva | A61C 7/20 433/20 |
| 6,036,489 A * | 3/2000 | Brosius | A61C 7/20 433/20 |
| 6,431,861 B1 * | 8/2002 | White | A61C 7/20 433/20 |
| 10,154,890 B2 | 12/2018 | Johnson et al. | |
| 10,463,453 B2 * | 11/2019 | Alauddin | C22C 30/02 |
| 10,575,929 B2 * | 3/2020 | Fasci | A61C 7/20 |
| 10,881,489 B2 | 1/2021 | Tong et al. | |
| 10,945,817 B1 * | 3/2021 | Alauddin | C22C 30/00 |
| 11,083,546 B2 * | 8/2021 | Cassalia | A61C 7/145 |
| 2002/0172910 A1 * | 11/2002 | Bond | A61C 7/20 433/20 |
| 2006/0073436 A1 * | 4/2006 | Raby | A61C 7/00 433/24 |
| 2008/0254403 A1 | 10/2008 | Hilliard | |
| 2008/0268398 A1 * | 10/2008 | Cantarella | A61C 7/20 433/20 |
| 2009/0061378 A1 * | 3/2009 | Kim | A61C 7/20 433/20 |
| 2010/0114538 A1 | 5/2010 | Sporbert | |
| 2010/0190128 A1 * | 7/2010 | Wool | A61C 7/20 433/20 |
| 2010/0304321 A1 * | 12/2010 | Patel | A61C 7/20 433/10 |
| 2011/0033814 A1 * | 2/2011 | Wool | A61C 7/20 433/20 |
| 2012/0231409 A1 * | 9/2012 | Farzin-Nia | A61C 7/28 433/20 |
| 2012/0322019 A1 * | 12/2012 | Lewis | A61C 7/20 433/10 |
| 2014/0045138 A1 * | 2/2014 | Gange | A61C 5/007 433/20 |
| 2014/0154637 A1 * | 6/2014 | Hansen | A61C 7/002 433/20 |
| 2014/0272760 A1 * | 9/2014 | Cameron | A61C 7/22 433/20 |
| 2015/0374461 A1 * | 12/2015 | Johnson | C22F 1/00 433/20 |
| 2016/0120623 A1 * | 5/2016 | Curley | A61C 7/20 433/20 |
| 2017/0151037 A1 | 6/2017 | Lee | |
| 2018/0221113 A1 * | 8/2018 | Tong | A61C 7/28 |

OTHER PUBLICATIONS

International Search Report, Jan. 11, 2022, 2 pages, from counterpart PCT/US21/54923.

Supplementary European Search Report dated Jan. 14, 2025, 12 pages, from counterpart application EP 21881061.

* cited by examiner

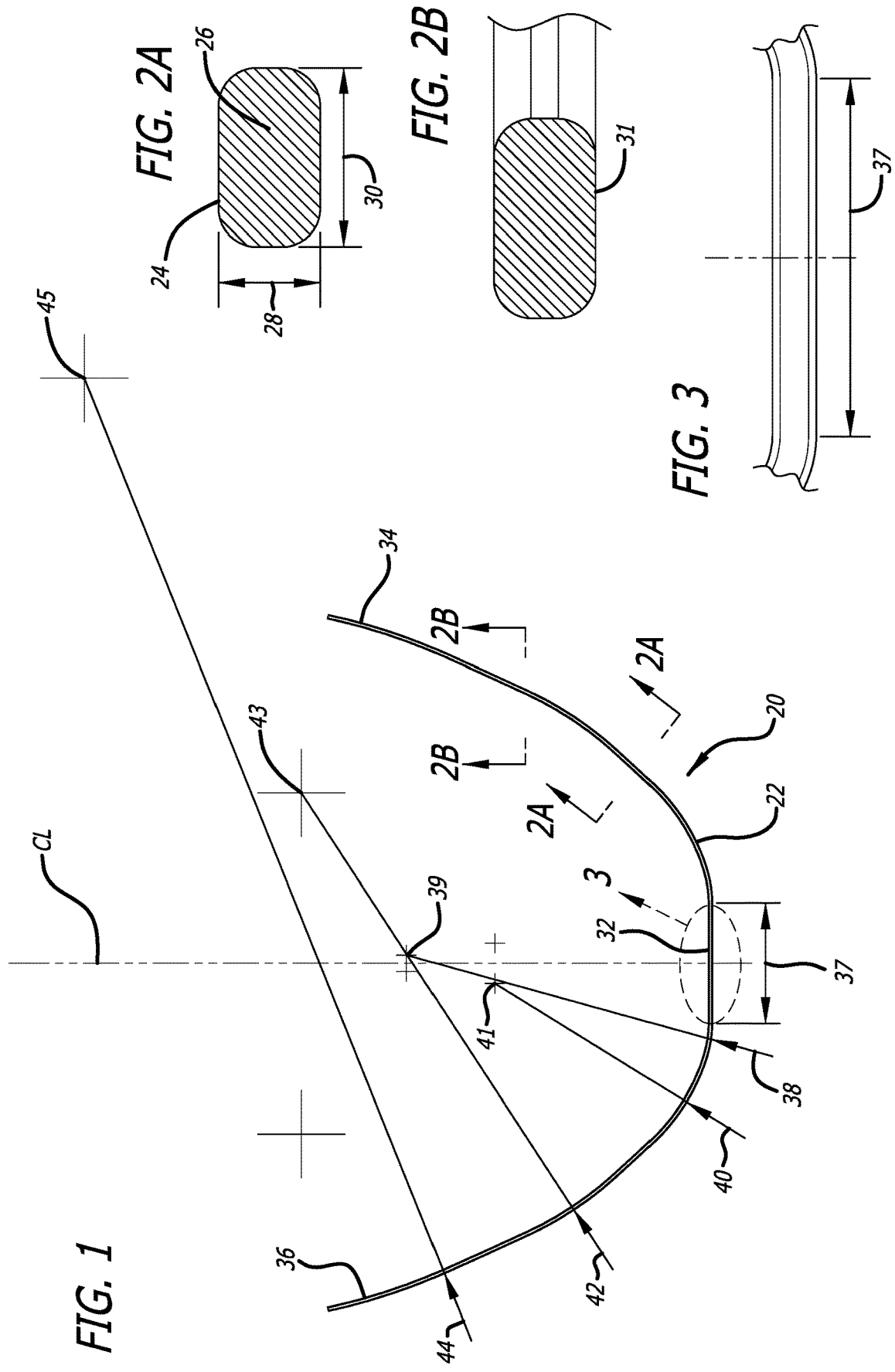

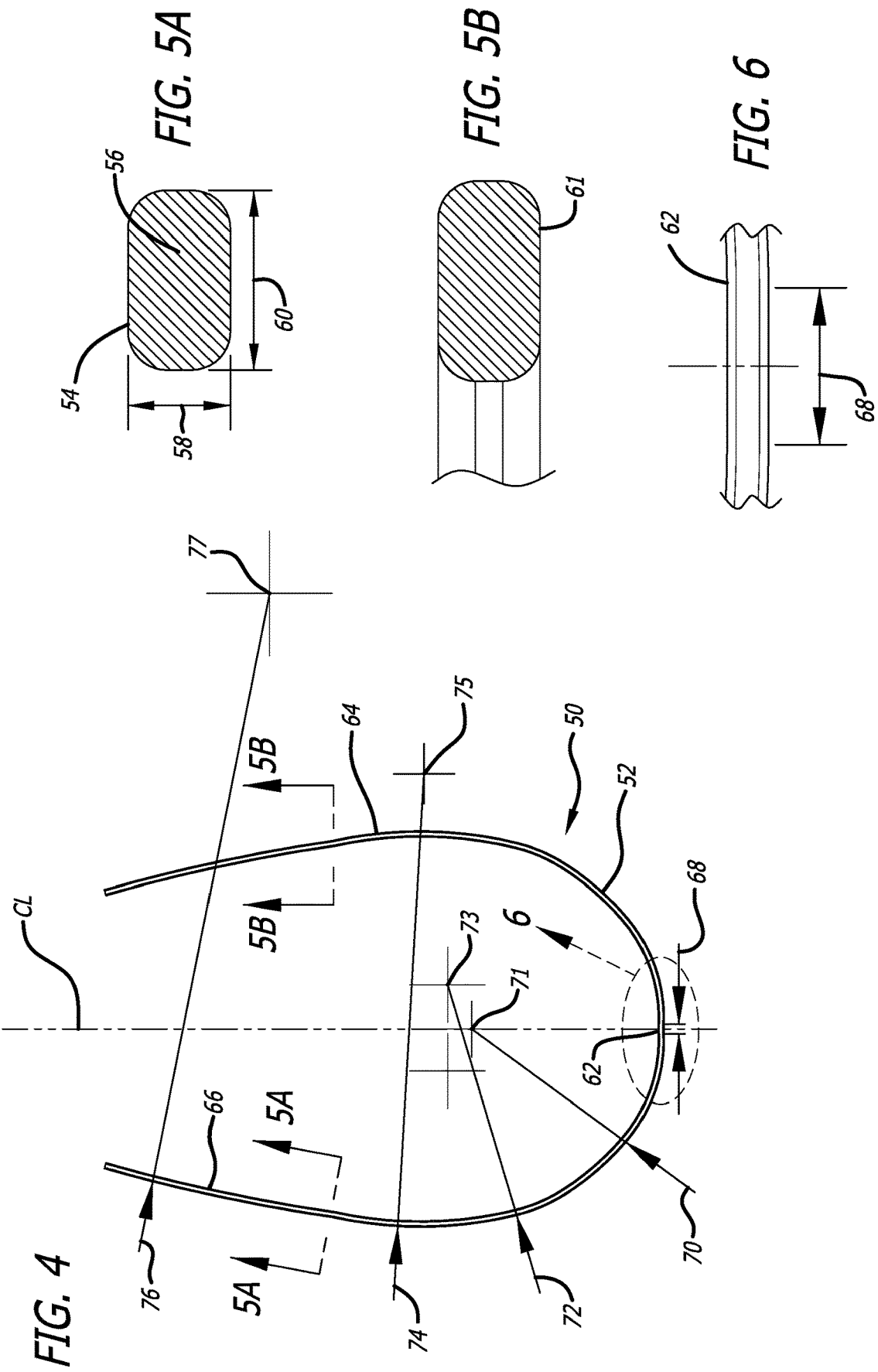

ORTHODONTIC ARCHWIRE

BACKGROUND

The invention relates to orthodontic devices, and more particularly, to a device used in conjunction with archwires employed in orthodontic procedures.

Orthodontic treatment normally involves the application of mechanical forces to urge improperly positioned teeth into correct alignment. One common form of orthodontic treatment includes the use of orthodontic brackets that are fixed to teeth such as by a band around individual teeth or, perhaps more commonly, by adhering the brackets directly to the teeth. A resilient curved archwire is then seated in the archwire slots of the brackets. The archwires are generally attached to the brackets by ligature wires or elastic bands. In some cases, however, self-ligating brackets are used that include a movable cover that selectively closes the labial side of the archwire slot of the brackets. The movable cover is opened for inserting the archwire and then closed for retaining the archwire within the archwire slot. When a patient's teeth are incorrectly leveled and aligned, the archwire elastically deforms to engage the brackets, thereby introducing a force that urges the teeth to move to the correct position over time.

Brackets of the self-ligating type include a movable cover that selectively closes the archwire slot of the brackets to secure the archwire to the bracket, eliminating the need for ligature wires or elastic bands. The movable cover is opened for inserting the archwire and then closed for retaining the archwire within the archwire slot. The archwire is elastically deformed to engage the brackets, and seeks to return to its designed curve, thereby imparting mechanical force that urges the teeth to move to the correct position over time. Once secured in the archwire slot by the cover, the archwire is free to move laterally in the archwire slot, which facilitates tooth movement during treatment.

A malocclusion is a misalignment or incorrect relation between the teeth of the two dental arches when they approach each other as the jaws close. The malocclusion classification is based on the relationship of the mesiobuccal cusp of the maxillary first molar and the buccal groove of the mandibular first molar. If this molar relationship exists, then the teeth can align into normal occlusion. Malocclusion is any deviation of the occlusion from the ideal. However, the assessment for malocclusion should also take into account aesthetics and the impact on functionality. If these are aspects are acceptable to the patient despite meeting the formal definition of malocclusion, then treatment may not be necessary.

Some malocclusions are severe and require orthodontic treatment. For example, Brodie Syndrome is a rare form of transverse malocclusion, characterized by excessive occlusion of the lateral zones, the contact is established between the palatal surfaces of the maxillary teeth and labial surfaces of the mandibular teeth, so that there is no intercuspidation of the maxillary and mandibular molars. It not only adversely affects chewing and muscle functions, but also impairs normal growth and development of the mandible if left untreated, with the possibility of jaw deformities. The anomaly may be bilateral or unilateral, clinical examination will search for signs of asymmetry or mandibular lateral deviation. Additional tests are generally needed to point out the alveolar or basal location of the malocclusion. Schematically, the therapeutic means used will seek to contract the maxillary arch, and expanding the lower arch. Orthodontic treatment is complex and prior art treatments are not always ideal or effective.

The orthodontic archwire of the present invention is configured to treat all types of malocclusions, including cross bite, Brodie bite, and constricted arches.

Traditionally, posterior crossbites have been corrected by use of a removable or fixed expansion device such as a hyrax expander or a quadhelix type device placed prior to fixed appliances. If a cross-bite was corrected while fixed appliances were in place, crossbite elastics were frequently utilized to produce the forces needed to expand the upper posterior arch and narrow the lower posterior arch to correct the bite.

The unique design of the present invention archwires allows the archform to be gently and gradually corrected simultaneously with other tooth movements as orthodontic treatment progresses. As the cross-sectional size of the arch wires is increased, as is typical of most contemporary orthodontic techniques, the unique shape of the upper archwires expands the upper arch in the posterior while maintaining the canine width and proper anterior curvature for optimal esthetics. At the same time, the unique shape of the lower arch wire opposes compensatory expansion of the lower arch, which would otherwise happen in many cases. While narrowing the poster arch, the shape of the lower arch wire retains the optimal anterior archform to coordinate with the upper anterior archform.

In the difficult clinical situation known as a Brodie Bite, where the upper arch is wider than the lower arch, the arch wires can be used in the opposite way, with the narrow arch wire in the upper and the expansion wire in the lower. Again, as the teeth are aligned, the unique design of these archwires allows the archform to be gently and gradually corrected simultaneously with other tooth movements as orthodontic treatment progresses.

SUMMARY OF THE INVENTION

In the current clinical environment, there is an emphasis on reducing the number and length of patient visits to the orthodontist. The present invention archwire is configured for use with modern self-ligating orthodontic brackets to expand the patient's arch to treat multiple malocclusions such as cross-bite, Brodie bite and constricted arches. The use of the present invention archwire formed from a superelastic material provides a faster and more predictable treatment outcome for the patient.

In one aspect of the present invention, an orthodontic archwire includes an elongated wire having a transverse rectangular cross-section along a length of the elongated wire. The transverse rectangular cross-section is the same size and shape all along the elongated wire. The elongated wire also includes a straight anterior section and a first posterior section and a second posterior section each extending from the straight anterior section. The first posterior section and the second posterior section each have multiple different radii of curvature and, in one embodiment, the first posterior section and the second posterior section are mirror images of each other. This embodiment prevents constriction of the canines when the wire is activated into the malocclusion.

In one embodiment, the straight anterior section of the elongated wire has a length that is less than 0.400 inch. In another embodiment, the straight anterior section has a length that is less than 0.675 inch. In another embodiment, the straight anterior section has a length that is less than 1.000 inch. In another embodiment, the first posterior section and the second posterior section each have a first radius of curvature of 0.542 inch, a second radius of curvature of 0.243 inch, a third radius of curvature of 0.763 inch, and a fourth radius of curvature of 0.378 inch.

In another embodiment, the first posterior section and the second posterior section each have a first radius of curvature of 0.770 inch, a second radius of curvature of 0.975 inch, a third radius of curvature of 0.843 inch, and a fourth radius of curvature of 0.253 inch.

The orthodontic archwire may be made from a metal alloy including stainless steel, NiTi, CuNiTi, Titanium Beta III, Elgiloy and superelastic metal alloys.

BRIEF DESCRIPTION OF THE DRAWINGS

FIG. 1 is a top view depicting an upper arch orthodontic archwire.

FIG. 2A is a transverse cross-sectional view taken along lines 2A-2A of the upper arch orthodontic archwire of FIG. 1.

FIG. 2B is a cross-sectional view taken along lines 2B-2B of the upper arch orthodontic archwire of FIG. 1.

FIG. 3 is a partial enlarged view of the straight anterior section of the upper arch orthodontic archwire.

FIG. 4 is a top view depicting a lower arch orthodontic archwire.

FIG. 5A is a transverse cross-sectional view taken along lines 5A-5A of the lower arch orthodontic archwire of FIG. 4.

FIG. 5B is a cross-sectional view taken along lines 5B-5B of the lower arch orthodontic archwire of FIG. 4.

FIG. 6 is a partial enlarged view of the straight anterior section of the lower arch orthodontic archwire of FIG. 4.

DETAILED DESCRIPTION OF THE PREFERRED EMBODIMENTS

In FIGS. 1-3, an upper arch orthodontic archwire 20 includes an elongated wire 22 having a transverse rectangular cross-section 24 along a length of the elongated wire. As shown in FIG. 2, the transverse rectangular cross-section 24 has an area 26 having a height 28 and a width 30. The height 28 and the width 30 are the same along the length of the elongated wire 22. Since the upper arch archwire 20 will be mounted in an archwire slot of a series of orthodontic brackets, the transverse rectangular cross-section is standard in the industry and typically can be 0.016 inch wide by 0.022 inch high. Other standard cross-sectional dimensions include 0.014 inch wide by 0.025 inch high; 0.018 inch wide by 0.025 inch high; 0.017 inch wide by 0.025 inch high; and 0.019 inch wide by 0.025 inch high.

The cross-sectional shape 31 of the elongated wire 22 shown in FIG. 28 has a different area as that shown in FIG. 2A because the section line is at an angle to the elongated wire. The rectangular shaped elongated wire 22 has rounded corners to enhance the comfort of the patient. It is contemplated that the transverse cross-section of the archwire can be other than rectangular, such as square, diametric, or other similar cross-sectional shape without departing from the scope of the invention.

The elongated wire 22 also includes a straight anterior section 32 and a first posterior section 34 and a second posterior section 36 each extending from the straight anterior section 32. The first posterior section 34 and the second posterior section 36 each have multiple different radii of curvature and, in one embodiment, the first posterior section and the second posterior section are mirror images of each other. This embodiment prevents constriction of the canines when the wire is activated into the malocclusion.

In one embodiment, the straight anterior section 32 of the elongated wire 22 has a length 37 that is less than 0.400 inch. In another embodiment, the straight anterior section 32 has a length 37 that is less than 0.675 inch. In another embodiment, the straight anterior section 32 has a length 37 that is less than 1.000 inch. In another embodiment, the first posterior section 34 and the second posterior section 36 each have a first radius of curvature 38 of 0.542 inch, a second radius of curvature 40 of 0.243 inch, a third radius of curvature 42 of 0.763 inch, and a fourth radius of curvature 44 of 0.378 inch.

Referring to centerline CL for the upper arch orthodontic archwire 20: a centerpoint 39 of the first radius of curvature 38 is 0.050 inch from the CL; a centerpoint 41 of the second radius of curvature 40 is 0.115 inch from the CL; a centerpoint 43 of the third radius of curvature 42 is 0.954 inch from the CL; and a centerpoint 45 of the fourth radius of curvature 44 is 3.270 inch from the CL.

In FIGS. 4-6, a lower arch orthodontic archwire 50 includes an elongated wire 52 having a transverse rectangular cross-section 54 along a length of the elongated wire. As shown in FIG. 5A, the transverse rectangular cross-section 54 has an area 56 having a height 58 and a width 60. The height 58 and the width 60 are the same along the length of the elongated wire 52. Since the lower arch archwire 50 will be mounted in an archwire slot of a series of orthodontic brackets, the transverse rectangular cross-section is standard in the industry and typically can be 0.016 inch wide by 0.022 inch high. Other standard cross-sectional dimensions include 0.014 inch wide by 0.025 inch high; 0.018 inch wide by 0.025 inch high; 0.017 inch wide by 0.025 inch high; and 0.019 inch wide by 0.025 inch high.

In FIG. 5B, the area 61 of the cross-section of the elongated wire 52 is different than area 56 in FIG. 5A because the section line is at an angel to the elongated wire 52. The rectangular shaped elongated wire 52 has rounded corners to enhance the comfort of the patient.

The elongated wire 52 also includes a straight anterior section 62 and a first posterior section 64 and a second posterior section 66 each extending from the straight anterior section 62. The first posterior section 64 and the second posterior section 66 each have multiple different radii of curvature and, in one embodiment, the first posterior section and the second posterior section are mirror images of each other. This embodiment prevents constriction of the canines when the wire is activated into the malocclusion.

In one embodiment, the straight anterior section 62 of the elongated wire 52 has a length 68 that is less than 0.040 inch. In another embodiment, the straight anterior section 32 has a length 68 that is less than 0.675 inch. In another embodiment, the straight anterior section 32 has a length 68 that is less than 1.000 inch. In another embodiment, the first posterior section 64 and the second posterior section 66 each have a first radius of curvature 70 of 0.770 inch, a second radius of curvature 72 of 0.975 inch, a third radius of curvature 74 of 0.843 inch, and a fourth radius of curvature 76 of 0.253 inch.

Referring to centerline CL for the lower arch orthodontic archwire 50: a centerpoint 71 of the first radius of curvature 70 is on the CL; a centerpoint 73 of the second radius of curvature 72 is 0.180 inch from the CL; a centerpoint 75 of the third radius of curvature 74 is 1.043 inch from the CL; and a centerpoint 77 of the radius of curvature 76 is 5.425 inch from the CL.

The dimensions disclosed herein are exemplary and can vary depending upon the orthodontist and/or patient requirements.

Although the forgoing embodiments have been described in some detail by way of illustration and example, certain changes and modifications may be made thereto without departing from the spirit and scope of the invention.

I claim:

1. An orthodontic archwire, comprising:
an upper arch orthodontic archwire having a transverse rectangular cross-section along a length thereof and having a first centerpoint of a first radius of curvature having a distance 0.050 inch from a centerline CL, a second centerpoint of a second radius of curvature having a distance 0.115 inch from the CL, a third centerpoint of a third radius of curvature having a distance 0.954 inch from the CL, and a fourth centerpoint of a fourth radius of curvature having a distance 3.270 inch from the CL;
the upper arch orthodontic archwire consisting of a first posterior section, a second posterior section and a straight anterior section being integral with the first posterior section and the second posterior section and positioned therebetween and being in the same plane as the first posterior section and the second posterior section; and
the first posterior section, the second posterior section, and the straight anterior section all having the same cross-sectional dimension; and
the first posterior section and the second posterior section have the same radii of curvature and are mirror images of each other.

2. The orthodontic archwire of claim 1, wherein the straight anterior section has a length less than 0.400 inch.

3. The orthodontic archwire of claim 1, wherein the straight anterior section has a length less than 0.675 inch.

4. The orthodontic archwire of claim 1, wherein the straight anterior section has a length less than 1.000 inch.

5. The orthodontic archwire of claim 1, wherein the transverse rectangular cross- section has rounded corners configured to enhance comfort for a patient.

6. The orthodontic archwire of claim 5, wherein the archwire is formed from a metal including any of stainless steel, NiTi, CuNiTi, Titanium Beta III, Elgiloy and superelastic metal alloys.

7. An orthodontic archwire, comprising:
a lower arch orthodontic archwire having a transverse rectangular cross-section along a length thereof and having a first centerpoint of a first radius of curvature on the CL, a second centerpoint of a second radius of curvature having a distance 0.180 inch from the CL, a third centerpoint of a third radius of curvature having a distance 1.043 inch from the CL, and a fourth centerpoint of a fourth radius of curvature having a distance 5.425 inch from the CL;
the lower arch orthodontic archwire consisting of a straight anterior section that is integral with and positioned between a curved first posterior section and a curved second posterior section wherein the straight anterior section is in the same plane as the curved first posterior section and the curved second posterior section; and
the curved first posterior section, the curved second posterior section, and the straight anterior section all having the same cross-sectional dimension; and
the curved first posterior section and the curved second posterior section have the same radii of curvature and are mirror images of each other.

8. The orthodontic archwire of claim 7, wherein the straight anterior section has a length less than 0.400 inch.

9. The orthodontic archwire of claim 7, wherein the straight anterior section has a length less than 0.675 inch.

10. The orthodontic archwire of claim 7, wherein the straight anterior section has a length less than 1.000 inch.

11. The orthodontic archwire of claim 7, wherein the transverse rectangular cross-section has rounded corners configured to enhance comfort for a patient.

12. The orthodontic archwire of claim 11, wherein the archwire is formed from a metal including any of stainless steel, Niti, CuNiTi, Titanium Beta III, Elgiloy and superelastic metal alloys.

13. An upper arch orthodontic archwire and a lower arch orthodontic archwire, comprising:
the upper arch elongated wire having a transverse diametric cross-section along a length thereof and the lower arch elongated wire having a traverse diametric cross-section along a length thereof;
the upper arch orthodontic archwire having a first centerpoint of a first radius of curvature having a distance 0.050 inch from a centerline CL, a second centerpoint of a second radius of curvature having a distance 0.115 inch from the CL, a third centerpoint of a third radius of curvature having a distance 0.954 inch from the CL, and a fourth centerpoint of a fourth radius of curvature having a distance 3.270 inch from the CL;
the lower arch orthodontic archwire having a first centerpoint of a first radius of curvature on the CL, a second centerpoint of a second radius of curvature having a distance 0.180 inch distance from the CL, a third centerpoint of a third radius of curvature having a distance 1.043 inch distance from the CL, and a fourth centerpoint of a fourth radius of curvature having a distance 5.425 inch distance from the CL;
the upper arch orthodontic archwire and the lower arch orthodontic archwire consisting of a straight anterior section that is integral with and positioned between a curved first posterior section and a curved second posterior section wherein the straight anterior section is in the same plane as the curved first posterior section and the curved second posterior section; and
the curved first posterior section, the curved second posterior section, and the straight anterior section all having the same cross-sectional dimension; and
the curved first posterior section and the curved second posterior section, for each and both the upper arch orthodontic arch wire and the lower arch orthodontic archwire, have the same radii of curvature and are mirror images of each other.

14. The orthodontic archwire of claim 13, wherein for each the upper arch orthodontic archwire and the lower arch orthodontic archwire the straight anterior section has a length less than 0.400 inch.

15. The orthodontic archwire of claim 13, wherein for each the upper arch orthodontic archwire and the lower arch orthodontic archwire the straight anterior section has a length less than 0.675 inch.

16. The orthodontic archwire of claim 13, wherein for each the upper arch orthodontic archwire and the lower arch orthodontic archwire the straight anterior section has a length less than 1.000 inch.

17. The orthodontic archwire of claim 13, wherein for each the upper arch orthodontic archwire and the lower arch orthodontic archwire the transverse diametric cross-section has rounded corners configured to enhance comfort for a patient.

18. The orthodontic archwire of claim 17, wherein for each the upper arch orthodontic archwire and the lower arch orthodontic archwire the archwire is formed from a metal including any of stainless steel, Niti, CuNiTi, Titanium Beta III, Elgiloy and superelastic metal alloys.

19. The orthodontic archwire of claim 13, wherein the first posterior section and the second posterior section of the lower arch orthodontic archwire each have the first radius of curvature of 0.770 inch, the second radius of curvature of 0.975 inch, the third radius of curvature of 0.843 inch, and the fourth radius of curvature of 0.253 inch.

* * * * *